M. W. HOWARD.
PERIPHERAL SIZE INDICATING MACHINE.
APPLICATION FILED OCT. 12, 1918.

1,325,943.

Patented Dec. 23, 1919.
2 SHEETS—SHEET 1.

Inventor.
Merton W. Howard
by Heard Smith & Tennant
Attys.

M. W. HOWARD.
PERIPHERAL SIZE INDICATING MACHINE.
APPLICATION FILED OCT. 12, 1918.
1,325,943.
Patented Dec. 23, 1919.
2 SHEETS—SHEET 2.
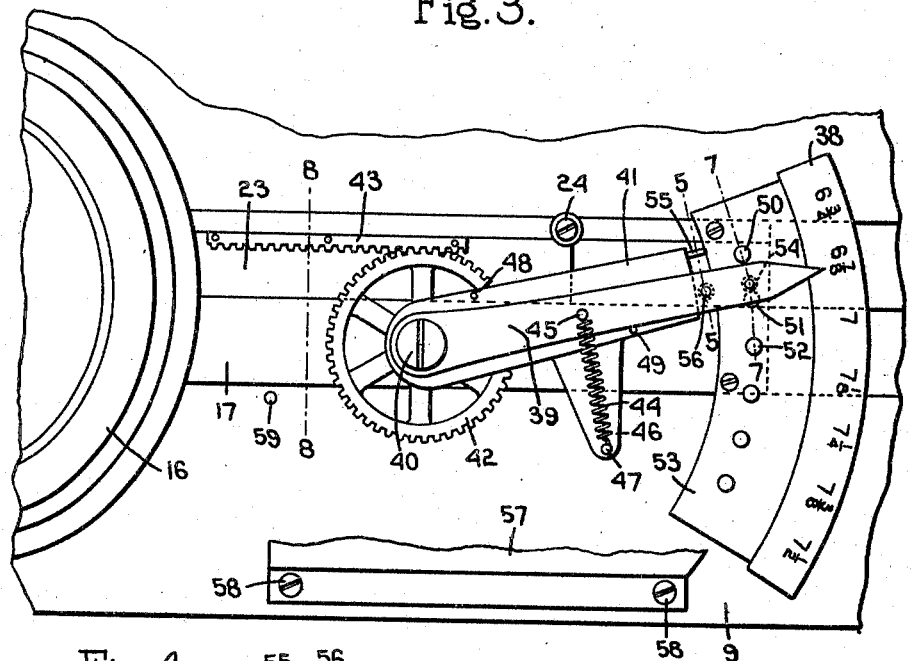
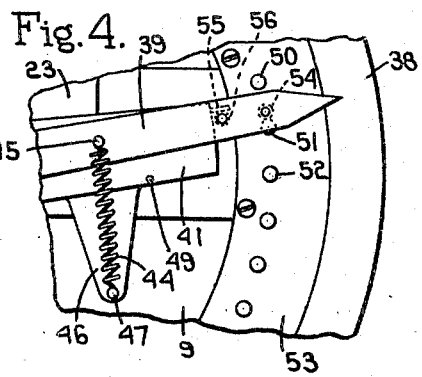
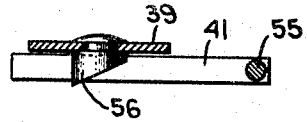
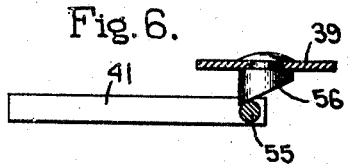
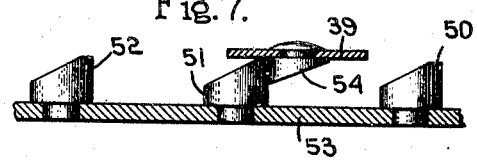
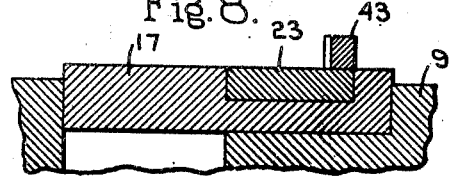
Inventor.
Merton W. Howard
by Heard Smith & Tennant
Attys.

UNITED STATES PATENT OFFICE.

MERTON W. HOWARD, OF LYNN, MASSACHUSETTS, ASSIGNOR TO A. E. LITTLE COMPANY, OF LYNN, MASSACHUSETTS, A CORPORATION OF MASSACHUSETTS.

PERIPHERAL-SIZE-INDICATING MACHINE.

1,325,943.  Specification of Letters Patent.  Patented Dec. 23, 1919.

Application filed October 12, 1918. Serial No. 257,879.

*To all whom it may concern:*

Be it known that I, MERTON W. HOWARD, a citizen of the United States, residing at Lynn, county of Essex, State of Massachusetts, have invented an Improvement in Peripheral-Size-Indicating Machines, of which the following description, in connection with the accompanying drawing, is a specification, like characters on the drawing representing like parts.

This invention relates to a machine for indicating variations in the peripheral size of objects and is particularly designed for indicating the size of hats or similar articles.
The preferred embodiment of the invention illustrated is still more particularly designed for indicating the size of sweat-band structures such as are employed in the steel helmets worn by the army.

The invention has for its object to provide a machine having a graduated scale bearing indicia to show unit variations in the periphery of the article and an indicator so operated that it will always point at a single indicia or graduation of the scale so that the operator will be relieved from all judgment as to the position of the indicator with respect to the scale, and the size or periphery of the article will be indicated only with that refinement provided by the graduations or indicia of the scale. Thus, for example, if hats or sweat-band structures are being measured and the scale is arranged in one-eighth sizes the indicator will only indicate variations of one-eighth size.

Another object of the invention is to provide for the application of a constant force in the means employed for measuring the periphery of the articles such as the hats so that the personal equation may be avoided and all measurements may be made with the same degree of accuracy.

The invention has for its further object to provide a machine of this character which shall be simple in construction and accurate in operation.

These and other objects of the invention will appear more fully from the accompanying description and drawings and will be particularly pointed out in the claims.

In the drawings,

Fig. 3 is a plan view on a larger scale of the main operative elements of the machine;

Fig. 4 is a view similar to Fig. 3 of a portion of the machine showing a different position of the parts;

Fig. 5 is an enlarged cross-section taken on the line 5—5 of Fig. 3;

Fig. 6 is a view similar to Fig. 5 with the parts in a different position;

Fig. 7 is an enlarged cross-section taken on the line 7—7, Fig. 3;

Fig. 8 is an enlarged cross-section taken on the line 8—8 of Fig. 3.

Figure 1:
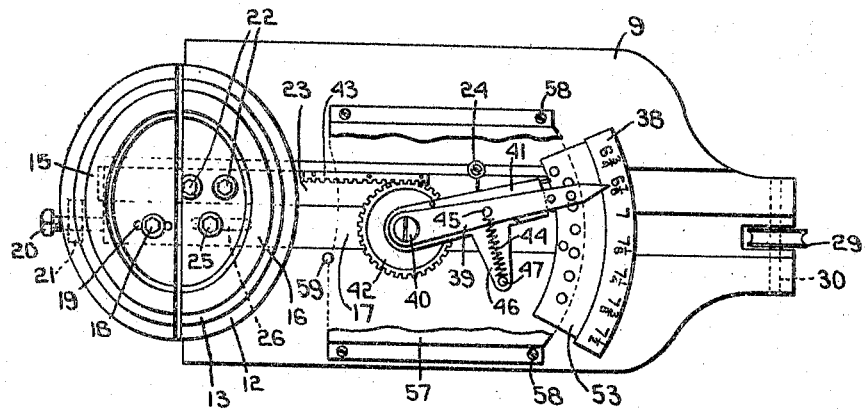
Figure 1 is a top plan view of a preferred form of machine embodying the invention.
Figure 2:
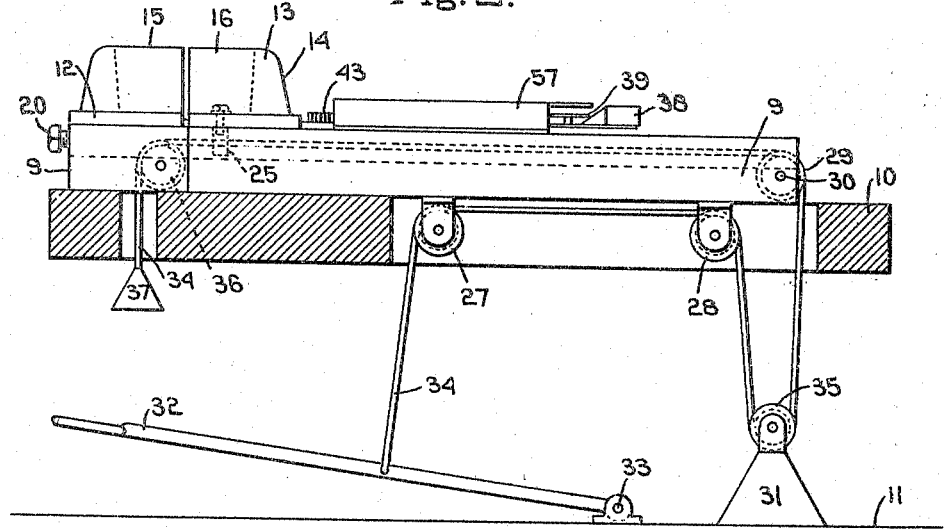
Fig. 2 is a side elevation partially in vertical cross-section of the machine and a suitable support therefor.

The preferred form of construction embodying the invention illustrated in the drawings is particularly designed for the measurement of sweat-band structures for steel helmets such as worn by the army, but the invention is not limited to the articles which are to be measured because it is obviously applicable to the measurement of any form of head covering, and of any other article the periphery of which is to be determined.

In the form of construction illustrated the machine is particularly designed for measuring the internal periphery of an article but the principles of the machine are not limited to the measurement of internal peripheries.

The invention provides a peripherally expansible form the exterior peripheral surface of the form being, in the construction illustrated, the part of the form which is utilized to effect the measurement of the article. Any suitable means may be employed for effecting the expansion and contraction of the form. A simple and preferred construction illustrated is a form of rigid contour having a fixed sector and a movable sector. The expansion and contraction of the form is thus effected by the movement of the movable sector away from and toward the fixed sector. When the articles to be measured are of an elastic nature as in the case of the sweat-band structures this arrangement of a rigid form divided into sectors is sufficient for the purpose and simplifies the construction of the machine.

The machine also comprises a graduated scale and this scale obviously may be of any form and bear any form of indicia. For the measurement of sweat-band structures it may be a simple metal scale bearing thereon at proper intervals the usual size numbers of hats.

The machine also comprises an indicator arranged to indicate the graduations on the scale and in its broader aspect the invention is not restricted to the particular means for indicating these graduations. In the construction illustrated a movable pointer is employed as a preferred form of the invention and this pointer is operated to move from one graduation of the scale to another and thus indicate the size of the periphery being measured.

One of the main objects of the invention as already pointed out is to relieve the operator from any necessity of the exercise of judgement and to remove all factors of personal equation which otherwise enter into the measurement of such more or less elastic articles as sweat-band structures or hats. If a scale is employed with a pointer movable to any point on the scale not only to the graduations but to any points intermediate thereof and if the position of the article being measured on the form has to be determined by the operative and the amount of force applied for expanding the form to fit the article has to be determined by the operative it is found in practice that different measurements will frequently be given by the same operator or by different operators for the same article.

In this invention all that the operative has to do is to place the sweat-band structure, hat or other article on the form in a defined position and then by a simple movement such as the pressure of the foot release a constant force which acts to expand the form to fit the interior periphery of the article and which will therefore cause the form always to assume this same amount of peripheral expansion for the same article. The machine is so arranged in this invention that, upon the release of this constant force, the indicator immediately moves to a definite graduation on the scale and cannot stop at any point intermediate the selected graduations. Thus the same measurements or the same size number is indicated for the same article or for articles of the same size under all conditions.

The mechanism of the machine is so arranged that when the actual measurement of the article being measured does not correspond exactly to any graduation on the scale the indication may take place on either the graduation above or below the theoretically correct point. Thus, for example, in the measurement of hats or sweat-band structures the machine is preferably arranged so that all hats from a given size and until the next size is reached are indicated as of the smaller size. Thus the wearer is insured of having a hat large enough for his head, and as in this particular case hats only run in certain size units the measurement is thus indicated with that degree of accuracy required.

In the machine in the form illustrated there is provided a bed plate 9 which may be given substantially the shape illustrated which serves to support the main parts of the machine. This bed plate may be mounted on any suitable support such as a bench or table 10 so as to stand at a convenient height from the floor 11.

The peripherally expansible form is shown as an annular structure of generally elliptical conformation having a flanged portion 12 resting on the bed plate and an upstanding portion 13 presenting the exterior periphery 14. This form is shown as expansible by reason of the fact that it is made in two sectors 15 and 16, each, in this case, comprising half the form. The external peripheral surface 14 is that which is utilized to ascertain the measurement of the article. The bed plate 9 is grooved longitudinally and in this groove is fitted a metal plate 17 extending longitudinally of the machine. The fixed sector 15 of the form is locked in position to this metal plate by a set screw 18 extending through a slot 19 in the base of the sector. A set screw 20 threaded through a projection 21 extending down from the sector 15 abuts against the rear end of the plate 17. Consequently the fixed sector 15 may be adjusted slightly and accurately on the bed plate 9 and then locked in place by the set screw 18. This adjustment is for the purpose of assembling the machine or for the purpose of subsequently adjusting the form to the required standard.

The movable sector 16 of the form is secured by set screws 22 to a second plate 23 which is mounted to slide longitudinally in a groove in the plate 17 and which is held in this groove by retainers 24. A stud 25 is secured to the base of the movable sector 16 and projects down through a slot 26 in the plate 17. Thus it will be seen that if the stud 25 be moved longitudinally the movable sector 16 will with the sliding plate 23 be moved toward and from the fixed sector 15 and thus the periphery of the form will be expanded or contracted.

A pair of idler pulleys 27 and 28 is mounted in brackets depending from the bed plate 9 and an idler 29 is mounted at the end of the plate 17 on a journal 30 extending through the bed plate. A weight 31 is located beneath the idler 29 and normally rests upon a suitable support such as the floor 11. A treadle 32 is shown pivotally mounted at 33 on the floor beneath the machine. A flexible connector such as a rope 34 extends from the treadle over the idler 27, thence over the idler 28, thence around a pulley 35 secured to the weight 31, thence over the idler 29 and beneath the plate 17 to the stud 25 to which it is connected. From this point the connector 34 extends over an idler 36 pivotally mounted in the bed plate and thence to a second weight 37 suspended on the connector.

The foregoing arrangement is devised as a simple and preferred means of applying a constant force to the expansion of the form. When the operative undertakes to measure a sweat-band structure, hat or similar article, she simply places it over the form until it rests upon the flange 12. She then depresses the treadle 32 which raises the weight 31 from its support and leaves it hanging on and supported by the connector. The form then expands by the application of force resulting from the weight 31 until it snugly fits the interior of the article being measured. Thus it will be seen that the force applied to the expansion of the form is the same at all times and consequently the form will expand to the same extent for a given article being measured regardless of the operative and to the same extent for all articles of the same size and characteristics that are being measured. This insures extreme accuracy in the expansion of the form to fit the article and thus ascertain its size.

When the operative has ascertained the measurement and the treadle has been released and the weight 31 has returned to its support then the weight 37 comes into action. This is just sufficient to return the movable sector of the form to its closed or contracted position.

The graduated scale is mounted upon the bed plate and is shown as a metal segment 38. The graduations or indicia of the scale will depend upon the nature of the article to be measured. In the case of sweat-band structures or hats these may consist simply of numbers corresponding to the standard sizes, as, for example, such numbers as those shown upon the drawing.

The indicator illustrated as a preferred embodiment of the invention is a pointer 39 pivotally mounted at 40 on the plate 17 and having its end swinging over the graduations of the scale. This pointer has a step by step or jumping movement from one graduation of the scale to the other so that it can only indicate one or the other of the graduations and cannot indicate any point between the graduations.

A simple and preferred means for operating the pointer to cause it to indicate upon the scale the peripheral adjustment of the form is shown in the drawings.

A pointer actuator shown as a swinging arm 41 is pivoted at the same point 40 as the pointer and extends beneath the pointer. This pointer actuator has secured thereto concentric with the pivot a pinion 42 and this pinion meshes with a rack 43 secured to the sliding plate 23.

A spring 44 is connected to the pointer at 45 and to a lateral extension 46 of the actuator at 47. Pins 48 and 49 projecting from the actuator serve to prevent undue movement of the pointer with respect to the actuator.

A series or row of fixed stops 50, 51, 52, etc., are mounted on the bed plate parallel or concentric with the graduations of the scale and for this purpose are shown projecting from a metal plate 53 secured to the base and which may be a part of the scale plate 38. A stud 54 projects from the lower face of the pointer 39 and the arrangement is such that when the stud 54 is in engagement with one of the stops the end of the pointer will be at a corresponding graduation on the scale.

The projection 54 on the pointer is beveled upwardly from its stop engaging side and the upper ends of the stops are correspondingly beveled as shown in Fig. 7.

The actuator 41 is provided with a projecting pin 55 coöperating with a projection 56 depending from the underface of the pointer and this projection is beveled in the same direction as the bevel of the projection 54, as shown in Figs. 5 and 6. It will thus be seen that as the actuator 41 moves clockwise when the pin 55 comes into engagement with the projection 56 it cams the end of the pointer upwardly and the arrangement is such that this camming action is sufficient to raise the projection 54 over the top of the fixed stop with which it is in engagement, whereupon the spring 44 acts to snap the pointer over into engagement with the next succeeding fixed stop. There is sufficient lost motion in the pivot of the pointer or sufficient spring in the pointer to enable this camming action to take place.

A sheet metal casing 57 is preferably employed and is secured to the bed plate at 58 and covers the working parts leaving only the point of the pointer and the scale uncovered.

The operation of the device will now be apparent. When as already described the operative has placed the article to be measured such as a sweat-band structure or hat upon the form and has depressed the treadle and the weight 31 has come into action and expanded the form or moved the movable sector of the form until the form snugly fits the article being measured, the sliding plate 23 will be carried forward and with it the rack 43. Presuming that when the operation started the pointer is in engagement with the first stud 50 the rack 23 will rotate the pinion 42 and swing the pointer actuator 41 bringing the pin 55 beneath the projection 56 and camming the pointer upwardly until it snaps off the stud 50 under the action of the spring 44 and snaps into engagement with the next stud 51. This operation will continue until the movement of the rack 43 caused by the expansion of the form has ceased. It will thus be seen that no matter what position the actuator 41 may assume the pointer will always have its projection 54 in engagement with one or the other of the fixed stops and consequently the point indicating one or the other of the specific graduations on the scale.

In the arrangement illustrated the pointer will remain at one of the graduations until the actuator has moved sufficiently to cam the pointer off the stop and cause it to snap to the next graduation so that any increase in the size of the article being measured over and above that corresponding to a smaller graduation is indicated by the smaller graduation until the next larger has been reached. Thus in the case of hats a hat is never measured too small in size. But it is obvious that the points in each unit movement of the expansion of the form at which the indicator shall move to the next point on the scale may be determined as desired by the relation of the pin 55 to the projection 56. That is to say, this pin 55 may act to cam the pointer off the stop at the beginning, at the end, or at any intermediate point of a unit movement of the actuator. In Fig. 5 the pin 56 is shown in its relation to the projection 56 at the beginning of a unit movement of the actuator and in Fig. 6 at the conclusion of a unit movement of the actuator, and is shown as camming the pointer sufficiently high to snap over the stud with which it is in engagement at the end of this unit movement. A stop pin 59 in the bed plate 9 prevents any undue expansion of the movable sector of the form.

Having fully described my invention, what I claim as new and desire to secure by Letters Patent is:

1. A machine of the class described comprising a peripherally expansible form, a graduated scale, an indicator, and means operated by the expanding movement of the form to cause the indicator to indicate only a single unit graduation of the scale for each unit of peripheral expansion of the form.

2. A machine of the class described comprising a peripherally expansible form, a graduated scale, an indicator, and means operated by the expanding movement of the form to cause the indicator to indicate the graduations of the scale step by step.

3. A machine of the class described comprising a peripherally expansible form, a graduated scale, an indicator, and means operated by the expanding movement of the form to cause the indicator at the beginning of each unit of expansion of the form to move to, and during the said unit expansion to remain at, that graduation of the scale corresponding to the peripheral size of the form at the beginning of said unit expansion.

4. A machine of the class described comprising a peripherally expansible form, a graduated scale, an indicator, and means operated by the expanding movement of the form to cause the indicator at a predetermined point in each unit movement of expansion to move to, and until a corresponding point is reached in the succeeding unit movement of expansion to remain at, a single graduation of the scale.

5. A machine of the class described comprising a peripherally expansible form, a graduated scale, a pointer movable step by step over the graduations of the scale, and means for causing each unit of expansion of said form to effect a jump movement of the pointer from one graduation to the next.

6. A machine of the class described comprising a form having a movable sector whereby its periphery may be varied, a graduated scale, a movable actuator, connections between said sector and said actuator acting to cause the movement of said actuator to take place proportionately to the variations in the periphery of the form, an indicator movable over the scale, and interengaging means between the actuator and the indicator acting to cause the indicator at a predetermined point in each unit movement of the actuator to move to, and until a corresponding point is reached in the succeeding unit movement of the actuator to remain at, a single graduation of the scale.

7. A machine of the class described comprising a peripherally expansible form, a graduated scale, a pointer movable over the scale, a row of fixed stops corresponding to the graduations of the scale and so positioned that when the pointer is in engagement with a stop it will point to the corresponding graduation, a movable pointer actuator, means operated by the expanding movement of the form to cause the movement of the pointer actuator to take place proportionately to the variation in the periphery of the form, and means acting when, a predetermined point in each unit, movement of said actuator has been reached, to cause the pointer to jump into engagement with the next stop.

8. A machine of the class described comprising a form having a movable sector whereby its periphery may be varied, a graduated scale, a pointer movable over the scale, and means operated by the movement of the sector to cause the pointer at a predetermined point in each unit movement of the sector to move to, and until a corresponding point is reached in the succeeding unit movement of the sector to remain at, a single graduation of the scale.

9. A machine of the class described comprising a form having a movable sector whereby its periphery may be varied, a graduated scale, a pivotally mounted pointer movable over the graduations of the scale, a pivotally mounted pointer actuator, connections between said sector and said actuator acting to cause the movement of said actuator to take place proportionately to the variations in the periphery of the form, and means acting to cause the pointer at a predetermined point in each unit movement of the actuator to move to, and until a corresponding point is reached in the succeeding unit movement of the actuator to remain at, a single graduation of the scale.

10. A machine of the class described comprising a peripherally expansible form, a graduated scale, a pivotally mounted pointer actuator, a pointer pivotally mounted on said actuator and movable over the graduations on the scale, a spring on the actuator engaging the pointer and acting to advance the pointer with respect to the actuator, a series of fixed stops acting when the pointer is in contact therewith to position the pointer at corresponding graduations on the scale, and interengaging means on the actuator and pointer acting when the actuator has moved a predetermined extent to cam the pointer over the stop with which it is in engagement and allow it to jump into engagement with the next stop.

11. A machine of the class described comprising a peripherally expansible form, and means for applying a predetermined constant force to said form to effect the expansion thereof.

12. A machine of the class described comprising a peripherally expansible form, and manually operated means for applying a predetermined constant force to said form to effect the expansion thereof.

13. A machine of the class described comprising a peripherally expansible form, and means for applying a predetermined constant force to said form to effect the expansion thereof, and means for contracting the form upon the withdrawal of the application of said force.

14. A machine of the class described comprising a form having a movable sector whereby its periphery may be varied, a support for said form with respect to which the said sector is movable, a weight, a support for said weight, a treadle, idler rolls mounted on said form support, a pulley on said weight and a flexible connector extending from said treadle over one or more of the idlers, thence around the pulley on said weight thence over another idler and connected to said sector whereby when the treadle is operated the weight will be lifted from its support and will hang on the connector thus applying a predetermined constant force to effect the movement of the sector.

15. A machine of the class described having the elements defined in claim 14 together with means for contracting the form upon the return of the weight to its support.

In testimony whereof I have signed my name to this specification.

MERTON W. HOWARD.